(12) United States Patent
Tan et al.

(10) Patent No.: US 8,996,668 B2
(45) Date of Patent: Mar. 31, 2015

(54) METHOD AND SYSTEM FOR STORING CONFIGURATION INFORMATION FOR NETWORK NODES IN A NETWORK MANAGEMENT SYSTEM

(75) Inventors: Lay Been Tan, Kanata (CA); Felix M. Landry, Gatineau (CA); Stephen Rosenberger, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2097 days.

(21) Appl. No.: 11/498,722

(22) Filed: Aug. 4, 2006

(65) Prior Publication Data

US 2008/0034070 A1 Feb. 7, 2008

(51) Int. Cl.
*G06F 15/173* (2006.01)
*H04Q 3/00* (2006.01)
*H04L 12/24* (2006.01)

(52) U.S. Cl.
CPC .......... *H04Q 3/0095* (2013.01); *H04L 41/0843* (2013.01); *H04L 41/0883* (2013.01); *H04L 41/0206* (2013.01); *H04L 41/0233* (2013.01); *H04L 41/06* (2013.01); *H04L 41/22* (2013.01)
USPC ........................................................ 709/223

(58) Field of Classification Search
CPC ............. H04Q 3/0095; H04L 41/0843; H04L 41/0883
USPC ......................................................... 709/223
See application file for complete search history.

(56) References Cited

U.S. PATENT DOCUMENTS

| | | | |
|---|---|---|---|
| 5,870,749 A * | 2/1999 | Adusumilli | 1/1 |
| 6,950,935 B1 | 9/2005 | Allavarpu et al. | |
| 7,076,650 B1 * | 7/2006 | Sonnenberg | 713/151 |
| 7,124,368 B1 * | 10/2006 | Subramanian et al. | 715/736 |
| 7,146,497 B2 * | 12/2006 | Almeida et al. | 713/100 |
| 2005/0004942 A1 * | 1/2005 | Madsen et al. | 707/104.1 |
| 2005/0039179 A1 * | 2/2005 | Eddie et al. | 717/171 |
| 2005/0071625 A1 | 3/2005 | Schwartz et al. | |
| 2006/0215576 A1 * | 9/2006 | Yu et al. | 370/252 |

OTHER PUBLICATIONS

Baras, et al., Dynamic Routing in Hybrid Networks with Integrated Voice and Data Traffic, American Institute of Physics, 1995, pp. 21-26, USA.
Chinese Office Action dated Apr. 13, 2011 for corresponding Chinese Application No. 200780029014.4.

* cited by examiner

*Primary Examiner* — Asad Nawaz
*Assistant Examiner* — Saad A Waqas
(74) *Attorney, Agent, or Firm* — Kramer & Amado, P.C.

(57) ABSTRACT

A method for storing configuration information for a network node in a network management system, the method comprising: installing a node type package for the node in the system, the node type package corresponding to a node type of the node, the node type package being a pluggable software module containing the configuration information; receiving a signal from a user to instantiate the node type for the node; presenting one or more items of the configuration information to a user in a configuration form displayed on a display screen of the system; and, receiving one or more signals from a user for adjusting one or more of the items.

28 Claims, 3 Drawing Sheets

METHOD AND SYSTEM FOR STORING CONFIGURATION INFORMATION FOR NETWORK NODES IN A NETWORK MANAGEMENT SYSTEM

FIELD OF THE INVENTION

This invention relates to the field of network management, and more specifically, to a method and system for storing configuration information for network nodes in a network management system using pluggable node types.

BACKGROUND OF THE INVENTION

The telecommunications management network ("TMN") provides a framework for achieving interconnectivity and communication across heterogeneous operating systems and telecommunications networks. TMN is defined in the International Telecommunications Union ("ITU") Telecommunications Services Sector ("ITU-T") M.3000 recommendation series (which are incorporated herein by reference). When telecommunications networks implement the TMN definitions, they become interoperable, even when interacting with the networks and equipment of other telecommunications service providers.

TMN uses object-oriented principles and standard interfaces to define communication between management entities in a network. TMN architecture and interfaces, defined in the ITU M.3000 recommendation series, build on existing open systems interconnection ("OSI") standards (which are incorporated herein by reference). These standards include the Common Management Information Protocol ("CMIP") which is a network monitoring and control standard which defines management services exchanged between peer entities. Other standards include the Guideline for Definition of Managed Objects ("GDMO") which provides templates for classifying and describing managed resources, the Abstract Syntax Notation 1 ("ASN.1") which provides syntax rules for data types, and the Open Systems Interconnect Reference Model which defines the seven-layer OSI reference model. (All of the preceding standards and protocols are incorporated herein by reference.)

Thus, TMN is based on the OSI management framework and uses an object-oriented approach, with managed information in network resources modeled as attributes in managed objects. Management functions are performed by operations comprised of Common Management Information Service ("CMIS") primitives. A network's managed information, as well as the rules by which that information is presented and managed, is referred to as the Management Information Base ("MIB"). Processes that manage the information are called "management entities". A management entity can take on one of two possible roles: "manager" or "agent". Manager and agent processes send and receive requests and notifications using the CMIP.

A central concept to understanding the operation of TMN is found in the area of object-oriented systems. The OSI Management Information Structure (frequently referred to as the Structure of Managed Information ("SMI")) is based on collections of objects, some defined in the ISO X.720 series of standards (which are incorporated herein by reference), others that can be found in the TMN M.3100 standards, along with application specific objects that describe the behaviour and offer control points for the specific managed systems. CMIP based MIBs are a collection of managed objects that contain attributes, exhibit some behaviours, can be created and deleted, and may optionally provide application specific actions that a manager can request. Each object can be viewed as possessing a certain set of behaviours, attributes, and actions. The behaviour of an object is directly related to the resource that it represents. For example, a termination point may exhibit the behaviours associated with its relationship with other system components. Attributes contained in an object describe the state and condition of the objects behaviour. Continuing with the termination point as an example, attributes can include references to other objects with which the termination point interacts such as a trail. Actions are services that the object can provide at the request of the management system. The templates for an object's behaviour are defined with GDMO and ASN.1 for TMN. As objects are identified by the management system agent or manager, objects are instantiated (another term for created). Each class of objects defined in the MIB can be instantiated as many times as the equipment and environment warrant.

Similar to CMIP, the Common Object Request Broker Architecture ("CORBA"), which is incorporated herein by reference, is an open distributed object infrastructure defined by the Object Management Group ("OMG"). OMG is an industrial consortium that, among other things, oversees the development and evolution of CORBA standards and their related service standards through a formal adoption process. CORBA standardizes and automates many common network programming tasks such as object implementation, registration, and location transparency. CORBA also defines standard language mappings of most popular languages for the programming interfaces to services provided by the Object Request Broker ("ORB"). An ORB is the basic mechanism by which objects transparently make requests to and receive responses from other objects on the same machine or across a network.

Now, a modern communications network (e.g., an Internet Protocol ("IP") based network) may include a number of network devices or nodes (e.g., routers) represented by managed objects. The network devices may be provided by a number of different manufacturers. In addition, the communications network may have a number of Network Management Systems ("NMS") for configuring (and provisioning, controlling, monitoring, etc.) the network devices. For example, the communications network may have first and second NMSs for first and second groups of network devices provided by first and second manufacturers, respectively. In turn, each NMS may be configured by one or more Operations Support Systems ("OSS"). Typically, an OSS is operated by a telecommunications service provider such as a local telephone company. Each OSS may be CMIP based or CORBA based. In such a system, each NMS will typically have an interface ("OSSI") for each protocol (i.e., CMIP, CORBA, etc.) used by its related OSSs.

The CMIP/CORBA OSSI is a standardized interface for use by network operators or service providers to provision the devices in their networks. The OSSI specifies the use of standardized object models to perform provisioning of corresponding network devices. However, one problem with such OSSIs is that they cannot be used to configure a new network device or node for which a standard object model has not yet been defined. This is problematic as the time required to reach agreement on and implement a standard object model using CMIP/CORBA can be significant. The delay in configuring such new network devices in turn causes a delay in the ongoing improvement of communications networks.

In particular, while a NMS may provide for custom or new node support by representing the new node with a single node type, different nodes have unique requirements and hence typically require unique handling mechanisms. For example, with respect to alarm support, different alarm agents may be required for each node type. To be implemented, these unique mechanisms often require changes in software code running on the NMS. These code changes can be costly and may adversely affect the reliability of the NMS, especially when they are first installed. While methods such as those described in U.S. Pat. No. 6,950,935 to Allavarpu et al. and in United States Patent Application Publication No. 2005/0004942 by Madsen et al. involve the use of pluggable modules in network management systems, they are not directed toward storing configuration information for new network devices or nodes.

A need therefore exists for an improved method and system for storing configuration information for network nodes in a network management system. Accordingly, a solution that addresses, at least in part, the above and other shortcomings is desired.

SUMMARY OF THE INVENTION

According to one aspect of the invention, there is provided a method for storing configuration information for a network node in a network management system, the method comprising: installing a node type package for the node in the system, the node type package corresponding to a node type of the node, the node type package being a pluggable software module containing the configuration information; receiving a signal from a user to instantiate the node type for the node; presenting one or more items of the configuration information to a user in a configuration form displayed on a display screen of the system; and, receiving one or more signals from a user for adjusting one or more of the items.

The method may further include reading the configuration information from the node type package and storing the configuration information in a configuration file for the node. Ones of the items may be configuration parameters for the node type. One of the items may be a node type string for identifying the node type within the system. One of the items may be an icon for the node type for presentation on the display screen. One of the items may be a communication script for launching a function for the node type. The function may be an element manager for the node type. The function may be defined in the communication script. Parameters of the communication script may be controlled by the node type package. One of the items may be an alarm plug-in for the node type. The method may further include storing the node type package in a database accessible by the system. The configuration information may identify which of the one or more items is presented on the display screen. One of the items may be a licensing key for the node type. The configuration information may identify a number of components within the node type. And, the number of components may be one or more of a number of shelves, a number of cards, and a number of ports.

In accordance with further aspects of the present invention there is provided an apparatus such as a data processing system (e.g., a network management system ("NMS"), a network node, etc.), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network management systems and network nodes described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
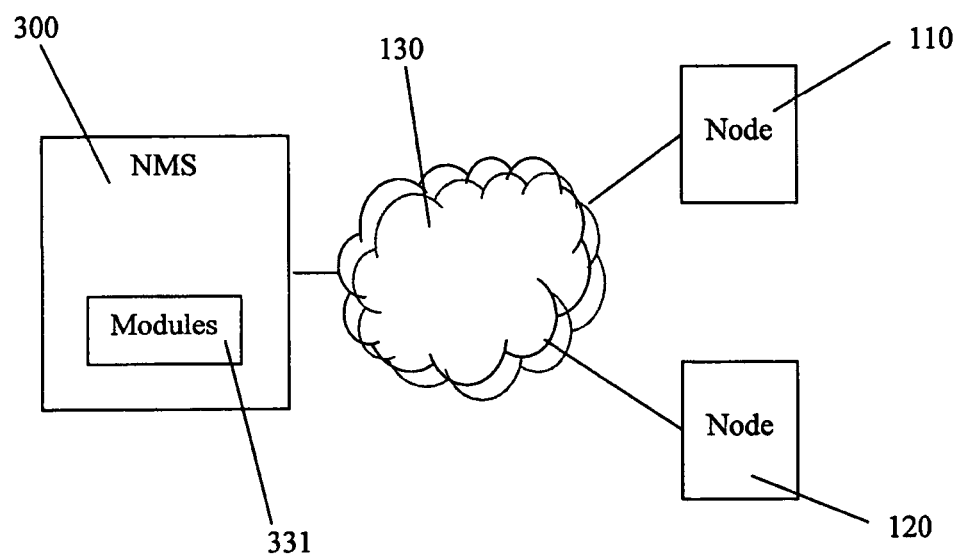
FIG. 1 is a block diagram illustrating a communications system adapted to implement an embodiment of the invention.

FIG. 1 is a block diagram illustrating a communications system 100 adapted to implement an embodiment of the invention. The communications system 100 includes a network management system ("NMS") 300 coupled to one or more network devices or nodes 110, 120 over a network 130 (e.g., an Internet Protocol ("IP") network). The network nodes 110, 120 may be switches, routers, etc. The NMS 300 and network nodes 110, 120 may be maintained by a service provider ("SP") to provide services to subscribers (not shown). The NMS 300 configures, controls, and monitors the network nodes 110, 120 coupled to it. The NMS 300 may be located at the SP's central office ("CO"), co-located with a network node, or located elsewhere.

Figure 2:
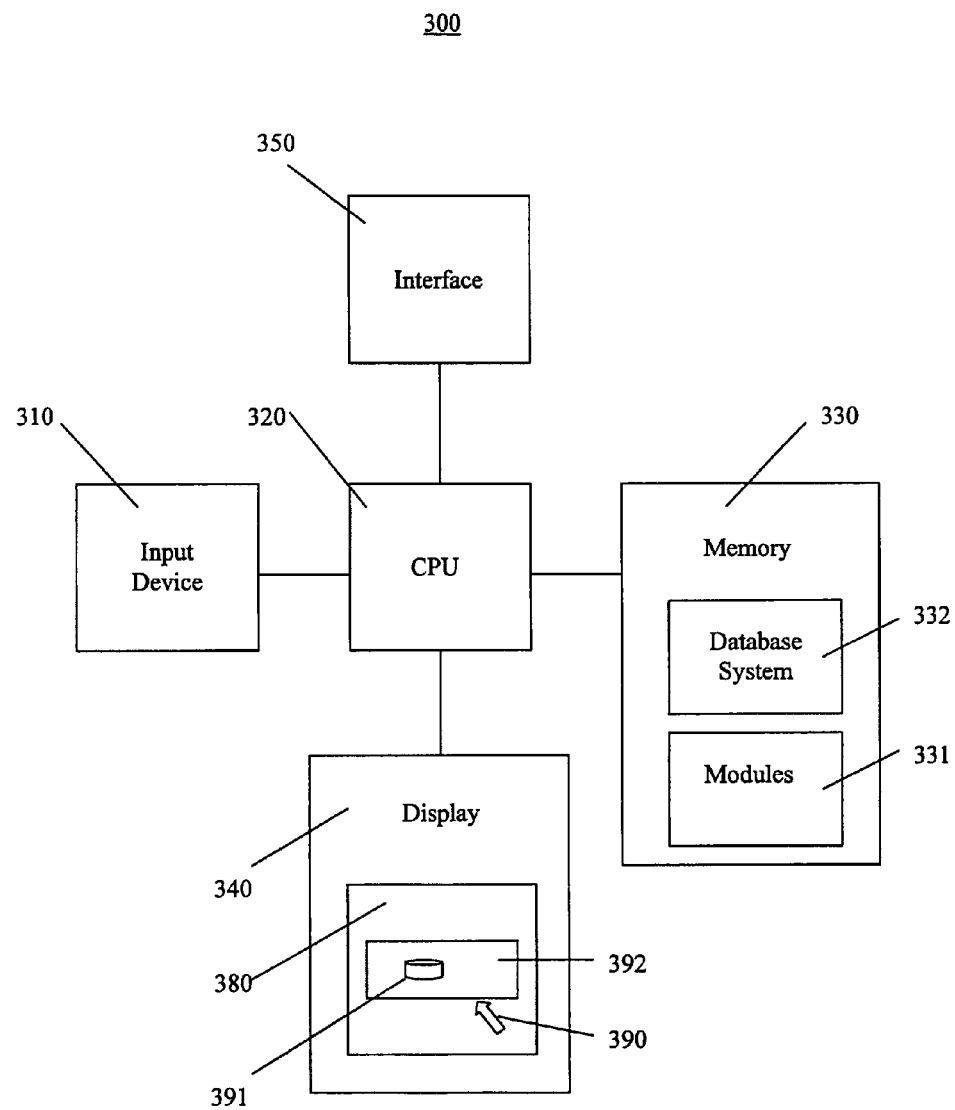
FIG. 2 is a block diagram illustrating a data processing system adapted to implement an embodiment of the invention; and, FIG. 3 is a flow chart illustrating operations of modules within the memory of a data processing system for storing configuration information for a network node, in accordance with an embodiment of the invention.

FIG. 2 is a block diagram illustrating a data processing system 300 adapted to implement an embodiment of the invention. The data processing system 300 may be a server system or a personal computer ("PC") system and is suitable for operation as or with a NMS 300 or network node 110, 120. The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300. The memory 330 may include RAM, ROM, disk devices, and databases. The memory 330 may include a variety of storage devices including internal memory and external mass storage typically arranged in a hierarchy of storage as understood to those skilled in the art. The interface device 350 may include a network connection. The data processing system 300 is adapted for communicating with other data processing systems (e.g., 110 or 120) over a network 130 via the interface device 350. The input device 310 may include a keyboard, a mouse, a trackball, or a similar device. And, the display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

A user may interact with the data processing system 300 and its hardware and software modules 331 using an optional graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object (e.g., an icon) 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

According to one embodiment, pluggable node type modules are provided for providing the information required by a network management system ("NMS") 300 to manage new types of network devices or nodes 110, 120. This pluggable node type feature allows a NMS 300 to learn about a new node type (or equipment type) through installation of a node type package. Once the node type is known to the NMS 300, users may create nodes of the installed node type in the NMS 300 and the basic functions of the NMS 300 (e.g., topology support (link creation), NMS connectivity status, listing, generic attributes, etc.) are made available for the created nodes. In addition, alarm plug-ins based on the NMS's generic alarm agent can be developed for the new node types and alarm support may then be made available for the new node types without any coding being required within the NMS's infrastructure for the support of the new node types. The development of alarm plug-ins for the new node types may be performed by a third party with no or little dependence on software releases relating to the NMS 300. (With respect to generic alarm agents, see U.S. patent application Ser. No. 11/347,882, entitled "Communication System Event Handling Systems and Techniques", filed Feb. 6, 2006, and incorporated herein by reference.)

The term "pluggable" means that through the installation of a node type package, support for a corresponding node type is provided for in the NMS 300. A "pluggable node type" refers to a network element (or node) type as defined by the installed node type package and which is supported through the pluggable node infrastructure of the NMS 300. This infrastructure provides common functionality for all pluggable node types. Examples of node types include multiservice cross-connect devices, single element management devices, switches, routers, etc. For example, node 110 may be a cross-connect device and node 120 may be a single element management device. A "new node type" may be a device that is not currently supported by the NMS 300. Example of new node types may include synchronous cross-connect devices, wideband digital cross-connect devices, Internet routers, etc. For example, node 120 may be a new Internet router node.

The "node type package" for a node type defines the following: how the NMS 300 labels nodes (or network elements) of this type; what icon (e.g., 391) is to be used by the NMS 300 to represent nodes of this type; what communication script the NMS 300 uses to communicate with nodes of this type; what configurable parameters the NMS 300 is to provide in configuration fields in its user interface (e.g., 380) for nodes of this type; the role (i.e., element manager or element managed node) of nodes of this type; which of the node's configuration parameters are required by the communication script; and, the alarm plug-ins for nodes of this type. The node type package is installed in the memory 330 of the NMS 300. The information contained in the node type package may be stored in the database 332 of the NMS 300 or in configuration files stored elsewhere in the memory 330 of the NMS 300.

Node type packages may be provided on the NMS's installation CD. For example, they may be listed under an "additional features" section of the installation CD. Typically, a separate package for each pluggable node type would be available on the installation CD. After a node type package is installed, a user is able to create nodes of that type through the NMS 300. For example, an icon 391 for the created node may be displayed on the display screen 340 as part of the NMS's main network map display (not shown). The NMS's basic functionality (e.g., configuration, creating links (topology), partitioning, highlighting, alarm surveillance, accessing the element manager of the node, etc.) is then made available for the node (e.g., 120).

Alarm plug-ins are included in the node type package (i.e., a user need not create their own). The NMS 300 includes a generic alarm agent which is an infrastructure (e.g., hardware or software modules 331) for providing common functionality for alarm management. In general, an alarm agent communicates with a node (e.g., 120) with respect to alarms occurring for that node 120. The alarm agent interprets messages from the node 120 and forwards these to a display application which will present an indication of the alarm to a user on the display screen 340 of the NMS 300. The alarm agent receives active alarms from nodes 110, 120 managed by the NMS 300 on start-up, listens for additional alarms as they appear, detects alarm loss conditions at nodes, polls a node in the event of an alarm loss condition at the node, etc. Common code is inherited from the general alarm agent for each alarm plug-in. As such, new plug-ins need only overwrite the functionality that is not common. In this way, coding to support alarm plug-ins is avoided. For a pluggable node type, the NMS 300 will read information in the installed node type package and will behave accordingly. There is no need for coding for an installed node type once the NMS's pluggable node type infrastructure is implemented.

The NMS 300 provides basic behaviour functionality to all pluggable nodes and allows these behaviours to be modified through a configuration file (or database entries). This functionality is described above and variations in labels, icons, communication scripts, and configuration files are determined by the NMS 300 by reading from the installed node type packages. The configuration file (or database entry) contains a node type string, a node icon, a communication script to launch the element manager of the node, parameters which are to be displayed and configured through the node's configuration form(s) (i.e., as presented to the user through the NMS's GUI 380), and information as to whether these parameters should be used as parameters in the communication script. Typically, plug-in configurations are stored in the database 332, that is, as records having fields for each node type that provide information as to where to retrieve icons, communication scripts, node labels, field labels for configurable parameters, etc. The node type string is used to label the node in the configuration form, in node drawings, etc. The node type string is also used when displaying equipment type in an equipment list, when searching for equipment of a specific type, or in network inventory reports (e.g., generated by a reporter module or by an analysis and inventory module ("AIM"), etc.) that detail all the equipment in a network along with various related information (including the type of the equipment, etc.). The node icon (e.g., 391) is an icon that represents a node (e.g., 120) in drawings, displays, and maps presented by the NMS 300 on its display screen 340. Typically a network node or element (e.g., 110, 120) has an element manager application which allows a user to further configure the network node or element. The communication script brings up the element manager application for a network element and presents it on the display screen 340 of the NMS 300. The parameters may include an Internet Protocol ("IP") address for the node, a mechanism to be used to poll the node, a name for the node, the manager for the node, etc. In general, all network elements have such parameters (or attributes). These parameters may be displayed in one or more configuration forms for the node presented to the user on the NMS's display screen 340, in selected object panels, etc. The parameters may be configured (i.e., changed, modified, edited, etc.) through the node's configuration form(s). A flag for each parameter that is initialized by the installation package indicates to the NMS 300 whether the parameter should be used as a parameter in the communication script for the node. Also, as mentioned, alarm plug-ins may be developed for the pluggable node types. The alarm plug-ins may be developed by the supplier of the NMS 300 or by a third party.

The installation package for a node type creates the configuration file (or the database entry) for corresponding nodes (e.g., 110, 120). Once the pluggable node type is created (i.e., through the pluggable node installation package) a user of the NMS 300, or the NMS 300 itself, can perform the following functions:

1. Create a node of the installed pluggable node type. After a pluggable node type is installed, the NMS 300 makes the type available to users through a node creation (or configuration) form.

2. Configure the parameters for the node through the node configuration form(s). The pluggable node type package informs the NMS 300 what fields should appear in the node creation (or configuration) form. The pluggable node type package defines which parameters are available for configuration. The node configuration form reads this information and displays appropriate fields and parameters to the user for configuration.

3. Perform a "communication active" command on the pluggable node to start the element manager of the node. The communication active command is a command available from the NMS's menu of commands. The communication active command may be initiated by a user by clicking on the corresponding menu item in the menu of commands. The element manager allows users to manage (i.e., it may provide mechanisms for configuring, provision, diagnostics, statistics collection, etc., all of which may vary based on make and model) their nodes. According to one embodiment, no configuration information is sent by the NMS 300 to the nodes or element managers that are modeled using pluggable node types. Rather, the embodiment allows the user to model or configure the association of a node to an element manager. This association already exists in the node's database and in the element manager's database. The representation of this association on the NMS 300 is what the user creates and configures.

4. Create links from ports on the pluggable node. A link on the NMS 300 represents a physical cable from one node (e.g., 110) to the other (e.g., 300, 120). Links are created through the NMS's user interface 380. A node created through the pluggable node type infrastructure may have links to other nodes.

5. Perform basic NMS functions such as the following: list node and link; highlight node, card, port and link; partition node, card and port; etc. The NMS 300 provides functions for managing a system 100 or network 130 of nodes 110, 120. Nodes (e.g., 110, 120) created through the NMS's pluggable node type infrastructure represent additional network elements that may make use of the NMS's various functions. In a network 100, 130, there may be thousands of nodes and links, listing these objects provides users with a manageable way of looking at all, or a subset, of the links and nodes in the network. These various listings are provided by the list node and link function of the NMS 300. In addition, a network 100, 130 may contain one or more groups of nodes. The highlighting function allows a user to visually locate a specific object (e.g., card, port, link, etc.) within a group of nodes, observe its relationship to other objects, etc. Furthermore, a service provider may lease parts of their network to different organizations. The partitioning function allows a user of the NMS 300 to allow access to selected nodes in the network to a selected organization and deny access to these node to other organizations.

6. Manage alarms for a node (e.g., 120) through the NMS 300 as if an alarm plug-in were available for the corresponding pluggable node type. The pluggable node type installation package informs the NMS 300 as to whether there is an alarm plug-in or not for a particular node type.

According to one embodiment, a configurable number of shelves, slots and ports for each pluggable node type may be provided. Initially, for example, a pluggable node may have a single shelf, a control board ("COMMS"), and a trunk card ("CUST") with 18 ports. Shelves, slots, and ports are objects that are typically included in a network node such as a switch or a router. Typically, a network node will have one or more shelves which store one or more cards with each card providing one or more ports.

According to one embodiment, the following features are provided by the pluggable node types:

1. Classification of node types as either element manager nodes or managed nodes. An element manager node typically has an element manager function that is used to manage other nodes or elements (i.e., managed elements). This allows for the following: (a) display of the relationship between an element manager and the nodes that it manages; (b) listing of all nodes managed by an element manager; (c) improvement in performance of the NMS 300 through the use of this information by alarm plug-ins to decide whether alarms should be collected from the element manager or from individual managed elements; and (d) identification by the NMS 300 of the role of the node type as being either an element manager node or a managed node.

2. Association of a managed node with an element manager node.

3. User selectable listing of all nodes managed by a specific element manager node. On creation of a node of a particular pluggable node type having an element managed role, the NMS's configuration form allows the user to specify the element manager node. Once the association is defined, the listing form can query the database for all nodes managed by an element manager node.

4. Association of node icons to each node type.

5. Expandability to support a configurable number of cards and ports for a node. This may be accomplished by adding more coded features to the pluggable node types and their supporting infrastructure in the NMS 300. The number of cards and ports configurable may be established by the installation package.

6. Use of alarm plug-ins for various node types. For example, if a first alarm plug-in which was develop for a first node is also suitable for use by a new second node type, the first alarm plug-in can be configured to support the second node type without any code changes to the alarm plug-in itself or to the NMS platform. That is, the generic alarm agent infrastructure may have configuration files which inform it as to which alarm agent to use for which node types.

According to one embodiment, several features in the NMS 300 may be controlled via the use of a license key. This capability is used to restrict the creation of nodes to node types that are allowed. The pluggable node type feature ensures that there are no changes required to the format of the license key to extend this functionality to the creation of new nodes using pluggable node types. A NMS license information screen (not shown) may be used to read from the installed node type packages and accurately display which of the installed node types are enabled and which are disabled. This license key generator does not require code changes either.

According to one embodiment, with respect to listings, users are given the option to search the network (i.e., the database) for nodes that are of a specific type. The specific type can be selected by the user as being a built-in node type or any node type that is specified in a pluggable node package. Every node type package that is installed causes the corresponding node type to appear in the list of node types that can be specifically searched for by the listing application of the NMS 300.

According to one embodiment, the communication script is not limited to launching an element manager. The communication script may be used to perform various actions using the configuration of the node that is stored in the NMS's database. For example, the action may be to launch a telnet session (to the node or the element manager) and to allow the user to subsequently interact with the node. As another example, the action may be the user configuring certain parameters (that are not accessible through the NMS 300) in a command line interface ("CLI") type control session. As another example, the action may be to open a telnet session to a node and prompt the user for a login/password, and subsequently have the script automatically launch a remote application (such as an element manager's GUI). Note that the NMS 300 is capable of sending some of the configuration parameters to the communication script (i.e., as arguments to the script). This allows the script to perform various tasks depending on the value of the parameters. For example, using a configurable IP address to telnet to a specific host. The node type package provides the NMS 300 with a list of all the configuration items that the script requires as parameters. The configurable parameters may be parameters built-in to the NMS 300 or parameters that are defined by the same node type package.

The present invention provides several advantages. First, code changes are not required to support a new node type, only configuration files will require modification. This reduces the time and associated cost required to provide support for new node types. While configuration files for new node types are required, creating these is less time consuming than making changes to NMS code to support the new node types. In addition, by leaving NMS code unaltered, the risk of causing software related errors and related service outages is reduced. Furthermore, the need to perform regression testing for the support of existing node types when support for a new node type is added is also reduced.

Figure 3:
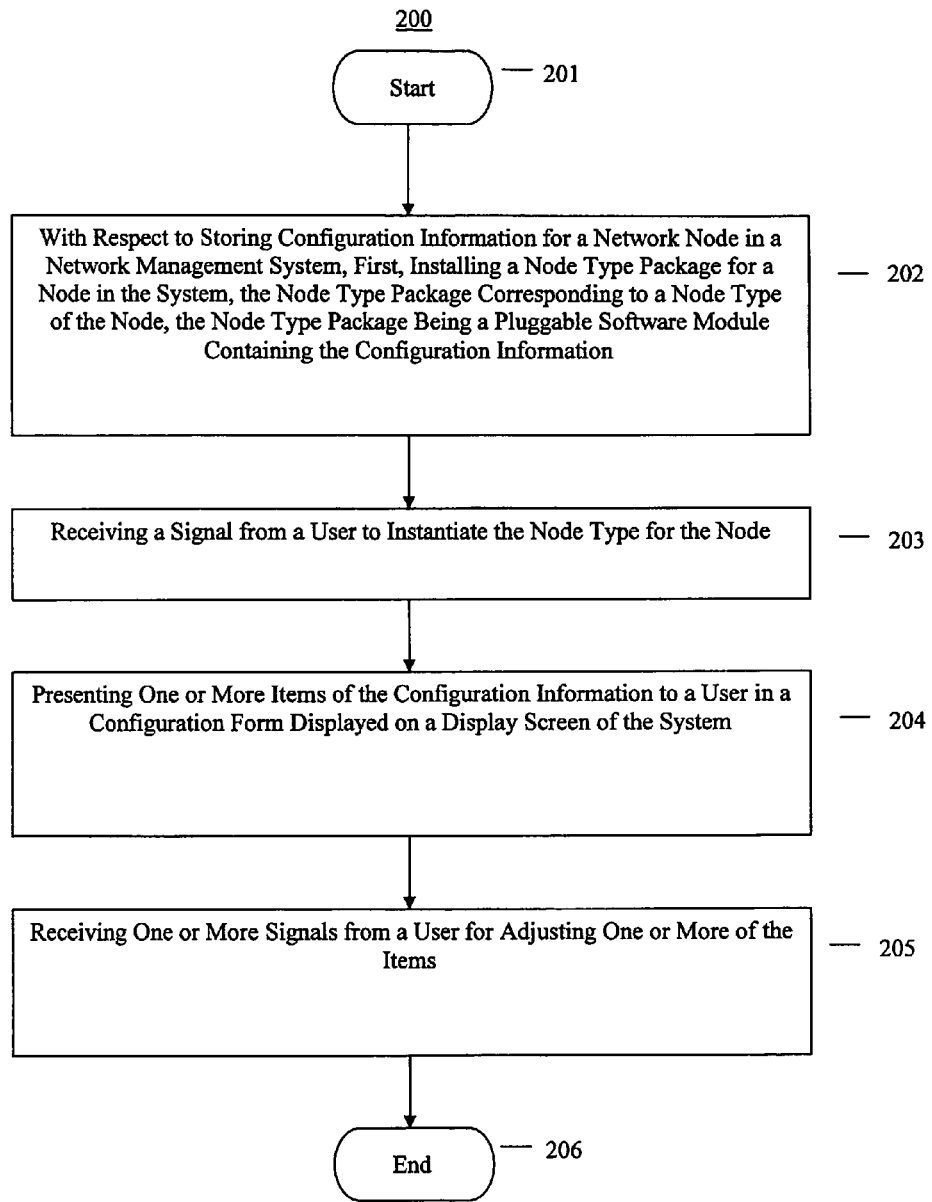

The above described method may be summarized with the aid of a flowchart. FIG. 3 is a flow chart illustrating operations 200 of modules 331 within the memory 330 of a data processing system (e.g., NMS 300) for storing configuration information for a network node (e.g., 120), in accordance with an embodiment of the invention.

At step 201, the operations 200 start.

At step 202, a node type package for a node 120 is installed in the system 300, the node type package corresponding to a node type of the node 120, the node type package being a pluggable software module containing the configuration information.

At step 203, a signal is received from a user to instantiate the node type for the node 120.

At step 204, one or more items of the configuration information are presented to a user in a configuration form displayed on a display screen 340 of the system 300.

At step 205, one or more signals are received from a user for adjusting one or more of the items.

At step 206, the operations 200 end.

The method may further include reading the configuration information from the node type package and storing the configuration information in a configuration file for the node 120. Ones of the items may be configuration parameters for the node type. One of the items may be a node type string for identifying the node type within the system 300. One of the items may be an icon 391 for the node type for presentation on the display screen 340. One of the items may be a communication script for launching a function for the node type. The function may be an element manager for the node type. The function may be defined in the communication script. Parameters of the communication script may be controlled by the node type package. One of the items may be an alarm plug-in for the node type. The method may further include storing the node type package in a database accessible by the system 300. The configuration information may identify which of the one or more items is presented on the display screen 340. One of the items may be a licensing key for the node type. The configuration information may identify a number of components within the node type. And, the number of components may be one or more of a number of shelves, a number of cards, and a number of ports.

According to one embodiment, the above described method may be implemented by a network node 110, 120 rather than by, or in combination with, the NMS 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment. This data carrier product can be loaded into and run by the data processing system 300 of FIG. 2. In addition, the sequences of instructions which when executed cause the method described herein to be performed by the data processing system 300 of FIG. 2 can be contained in a computer software product (e.g., software modules) according to one embodiment. This computer software product can be loaded into and run by the data processing system 300 of FIG. 2. Moreover, the sequences of instructions which when executed cause the method described herein to be performed by the data processing system 300 of FIG. 2 can be contained in an integrated circuit product (e.g., hardware modules) including a coprocessor or memory according to one embodiment. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method for storing, in a network management system (NMS), configuration information for network nodes in a network, the method comprising:
    installing a node type package in the NMS, the node type package corresponding to a node type that is not currently supported by the NMS, the node type package being a pluggable software module containing the configuration information, wherein the pluggable software module allows the NMS to support the corresponding node type, providing common functionality to different supported node types;
    receiving a signal from a user in the NMS after installation of the node type package to create a new node as an instance of the node type;
    presenting one or more items of the configuration information to a user in a configuration form displayed on a display screen of the NMS, the presented configuration information relating to the new node, wherein at least one of the items is a communication script for launching a function for the node type; and
    receiving one or more signals from a user for adjusting one or more of the items to configure the new node.

2. The method of claim 1, further comprising reading the configuration information from the node type package and storing the configuration information in a configuration file for the new node.

3. The method of claim 1, wherein at least one of the items relates to configuration parameters for the node type.

4. The method of claim 1, wherein at least one of the items is a node type string for identifying the node type within the NMS.

5. The method of claim 1, wherein at least one of the items is an icon for the node type for presentation on the display screen.

6. The method of claim 1, wherein the function is an element manager for the node type.

7. The method of claim 1, wherein the function is defined in the communication script.

8. The method of claim 1, wherein parameters of the communication script are controlled by the node type package.

9. The method of claim 1, wherein at least one of the items is an alarm plug-in for the node type.

10. The method of claim 1, further comprising storing the node type package in a database accessible by the NMS.

11. The method of claim 1, wherein the configuration information identifies which of the one or more items is presented on the display screen.

12. The method of claim 1, wherein at least one of the items is a licensing key for the node type.

13. The method of claim 1, wherein the configuration information identifies a number of components within the node type.

14. The method of claim 13, wherein the number of components is one or more of a number of shelves, a number of cards, and a number of ports.

15. A network management system (NMS) for storing configuration information for nodes in a network, the NMS comprising:
    a processor coupled to memory; and
    modules within the memory and executed by the processor, the modules including:
        a module for installing a node type package in the NMS, the node type package corresponding to a node type that is not currently supported by the NMS, the node type package being a pluggable software module containing the configuration information, wherein the pluggable software module allows the NMS to support the corresponding node type, providing common functionality to different supported node types,
        a module for receiving a signal from a user in the NMS after installation of the node type package to create a new node as an instance of the node type,
        a module for presenting one or more items of the configuration information to a user in a configuration form displayed on a display screen of the NMS, the presented configuration information relating to the new node, wherein at least one of the items is a communication script for launching a function for the node type, and a module for receiving one or more signals from a user for adjusting one or more of the items to configure the new node.

16. The NMS of claim 15, further comprising a module for reading the configuration information from the node type package and for storing the configuration information in a configuration file for the new node.

17. The NMS of claim 15, wherein at least one of the items relates to configuration parameters for the node type.

18. The NMS of claim 15, wherein at least one of the items is a node type string for identifying the node type within the NMS.

19. The NMS of claim 15, wherein at least one of the items is an icon for the node type for presentation on the display screen.

20. The NMS of claim 15, wherein the function is an element manager for the node type.

21. The NMS of claim 15, wherein the function is defined in the communication script.

22. The NMS of claim 15, wherein parameters of the communication script are controlled by the node type package.

23. The NMS of claim 15, wherein at least one of the items is an alarm plug-in for the node type.

24. The NMS of claim 15, further comprising a module for storing the node type package in a database accessible by the NMS.

25. The NMS of claim 15, wherein the configuration information identifies which of the one or more items is presented on the display screen.

26. The NMS of claim 15, wherein at least one of the items is a licensing key for the node type.

27. The NMS of claim 15, wherein the configuration information identifies a number of components within the node type.

28. The NMS of claim 27, wherein the number of components is one or more of a number of shelves, a number of cards, and a number of ports.

* * * * *